Dec. 21, 1937.                T. H. SANDERS                2,102,750
                             LAMINATED SPRINGS
                       Filed Sept. 8, 1936         2 Sheets-Sheet 1
Fig. 1.
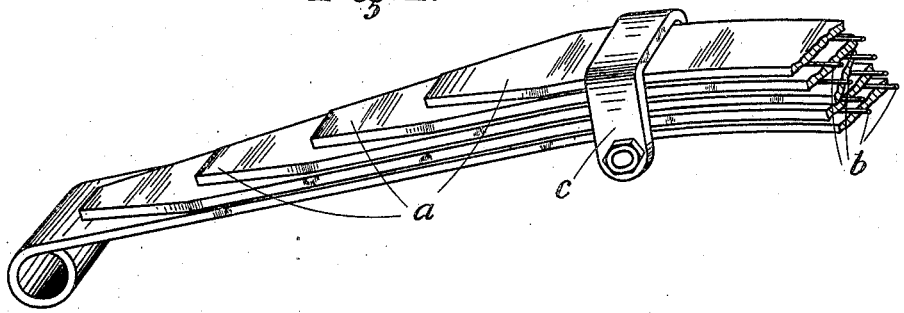
Fig. 2.
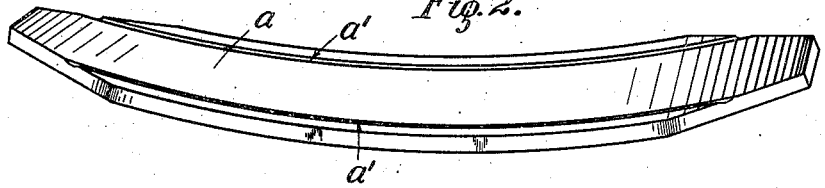
Fig. 3.                          Fig. 4.
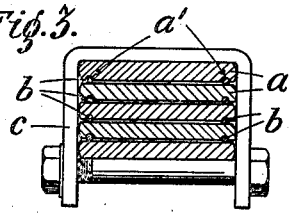            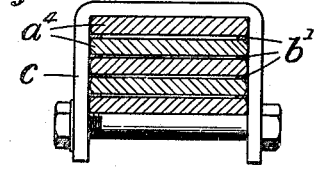
Fig. 5.
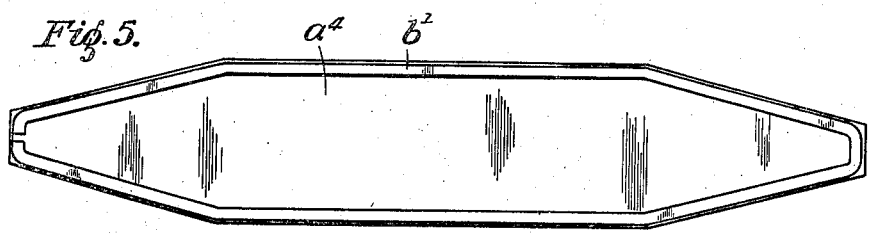
Fig. 6.
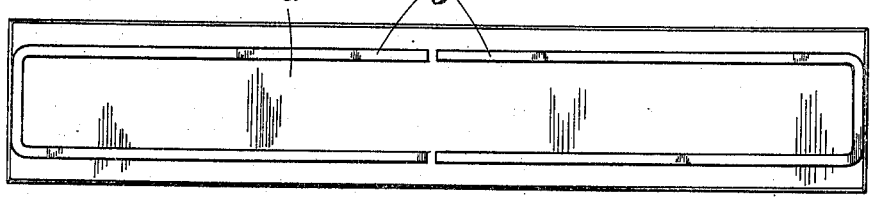
Inventor
Thomas H. Sanders
per Richard E. Babcock
                Attorney.

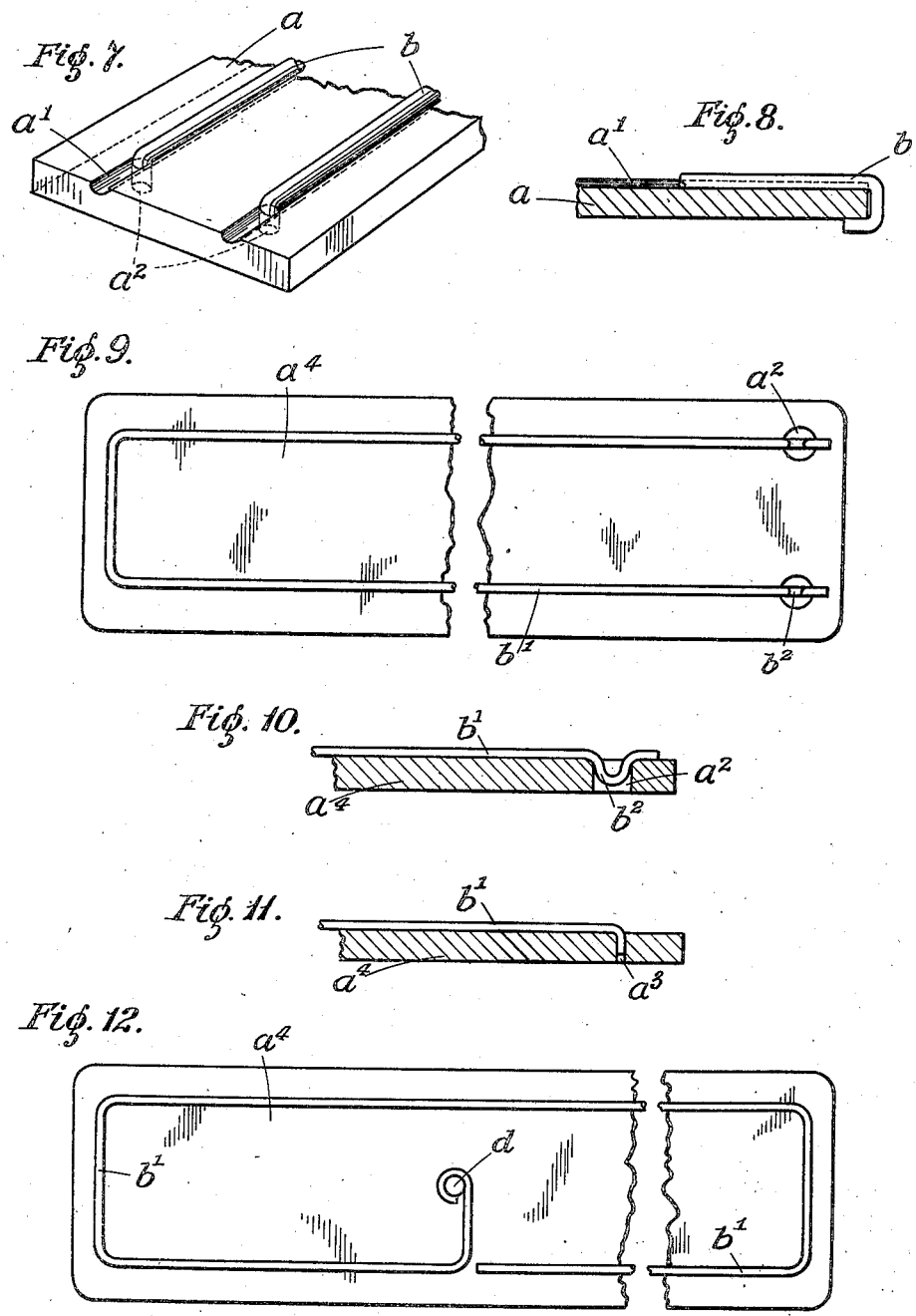

UNITED STATES PATENT OFFICE 2,102,750

LAMINATED SPRINGS

Thomas Henry Sanders, Leeds, England

Application September 8, 1936, Serial No. 99,835
In Great Britain October 22, 1935

1 Claim. (Cl. 267—49)

This invention relates to laminated springs and has for its object to eliminate direct interleaf friction.

I am aware that various methods have already been suggested to reduce the friction which takes place between the plates or leaves of a laminated spring when in service, including the use of interleaves of a non-ferrous metal and the introduction of balls or rollers between the ends of the spring leaves. It is found, however, that satisfactory results can only be expected with such methods so long as the contacting surfaces remain smooth and clean.

The present invention introduces a new principle into the design of laminated springs, the leaves being interspaced as distinguished from being interleaved. For this purpose adjacent spring plates are separated from each other by means of wire insertions.

In the accompanying drawings,

Figure 1 is a general view of part of a laminated spring embodying the present invention.

Figure 2 is a view of the compression side of a spring plate grooved to receive the interspacing devices.

Figures 3 and 4 are cross-sectional views showing different forms and arrangements of the interspacing devices.

Figures 5 and 6 are plan views of spring plates with different forms of interspacing frames.

Figures 7 and 8 show alternative ways in which the interspacing devices are prevented from endwise movement along their grooves.

Figures 9 and 10 are plan and part sectional edge views illustrating a method of anchoring the interspacing devices between spring plates of ordinary section.

Figures 11 and 12 are sectional and plan views respectively showing other ways of preventing displacement of the interspacing devices.

According to one way of carrying out the invention the spring plates $a$, as shown in Figure 3, are spaced apart and supported out of contact with each other by means of wires $b$, which are inserted between them along their longitudinal marginal edges during the assembly of the spring. In this case the plates may be rolled or otherwise formed on the compression side with longitudinal grooves $a^1$, Figure 2, to receive and locate the wires. The diameter of the wires is greater than the depth of the grooves so that when assembled the plates $a$ are separated from each other by an air space, the wires constituting the only interplate bearings.

In order to prevent endwise movement of the interspacing wires $b$ along their grooves $a^1$ during the flexing of the spring in service, the ends of the wires may be turned into holes $a^2$ in the plate as shown in Figure 7, or bent back over the ends thereof as seen in Figure 8.

It is not, however, essential for the purposes of the invention to employ spring plates of special section for retaining the wire insertions in position. In the case of spring plates $a^4$ of ordinary section the wire which may be of a flat section, as seen in Figure 4, is fashioned into the form of a flat rectangular frame $b^1$ the width of which is co-extensive with that of the spring plates so that the usual spring clips $c$ will prevent the frames from lateral displacement. These frames may be made of one piece of wire, as shown in Figure 5 or in two pieces as seen in Figure 6.

The need for grooving the spring plate to retain the wire interspacing in position may also be avoided by perforating or slotting the plate to receive the ends or cranked portions of the wire. For example, as shown in Figures 9 and 10, the ends $b^2$ of the wire frame $b^1$ are cranked to engage holes $a^2$ in the end of the spring plate $a^4$. Alternatively, the ends of the wire frame $b^1$ may be bent at right angles to engage smaller holes $a^3$ in the plate $a^4$ in the manner shown in Figure 11. The arrangement shown in Figures 9 and 10, is, however, preferred as it enables larger holes to be drilled in the plate. Another way of anchoring the wire frame is seen in Figure 12 in which advantage is taken of the usual centre bolt $d$ of the spring as a means of preventing displacement of the wire frame $b^1$, one end of which may be conveniently formed to engage the said bolt.

The choice of section, diameter and material for the wire will depend upon the effect it is desired to obtain in each case. If it is desired to obtain for the spring the maximum degree of responsiveness to rapidly fluctuating loads the diameter and material of the wire will be selected so as to offer little or no resistance to the free flexing of the spring plates. For this purpose interspacing wire of bright drawn steel and small section may be employed in combination with grooved spring plates. If, on the other hand, it is desired to produce a damping effect the diameter and material of the interspacing wire will be such as to require an appreciable effort to cause it to adapt itself to the constant flexing of the spring plates. For this purpose wire of mild steel or non-ferrous material, and of relatively large diameter may be employed. In this case it will be observed that the damping effect is not produced by friction but is due to the resistance offered by the plastic state of the wire to bending stresses as the spring plates flex and reflex.

I claim:—

In laminated springs the provision between and along the longitudinal marginal edges of the plates thereof of wire adapted to separate adjacent plates from each other and to be retained in position by engaging holes in said plates.

THOMAS HENRY SANDERS.